(12) United States Patent
Nia et al.

(10) Patent No.: US 12,493,796 B2
(45) Date of Patent: Dec. 9, 2025

(54) USING GENERATIVE ADVERSARIAL NETWORKS TO CONSTRUCT REALISTIC COUNTERFACTUAL EXPLANATIONS FOR MACHINE LEARNING MODELS

(71) Applicant: Oracle International Corporation, Redwood Shores, CA (US)

(72) Inventors: Karoon Rashedi Nia, Vancouver (CA); Tayler Hetherington, Vancouver (CA); Zahra Zohrevand, Vancouver (CA); Yasha Pushak, Vancouver (CA); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 955 days.

(21) Appl. No.: 17/124,018

(22) Filed: Dec. 16, 2020

(65) Prior Publication Data

US 2022/0188645 A1 Jun. 16, 2022

(51) Int. Cl.
*G06N 3/088* (2023.01)
*G06N 3/045* (2023.01)

(52) U.S. Cl.
CPC .............. *G06N 3/088* (2013.01); *G06N 3/045* (2023.01)

(58) Field of Classification Search
CPC .......... G06N 3/088; G06N 3/045; G06N 3/08; G06N 3/04; G06N 3/063
See application file for complete search history.

(56) References Cited

U.S. PATENT DOCUMENTS

| | | | |
|---|---|---|---|
| 2019/0130212 A1* | 5/2019 | Cheng | G06N 3/045 |
| 2019/0197357 A1 | 6/2019 | Anderson et al. | |
| 2019/0197368 A1* | 6/2019 | Madani | G06N 3/045 |

(Continued)

OTHER PUBLICATIONS

Linardatos et al., "Explainable AI: A Review of Machine Learning Interpretability Methods", Entropy, 23(1), 2021, 45 pages.

(Continued)

*Primary Examiner* — Kamran Afshar
*Assistant Examiner* — Brian J Hales
(74) *Attorney, Agent, or Firm* — Hickman Becker Bingham Ledesma LLP

(57) ABSTRACT

Herein are counterfactual explanations of machine learning (ML) inferencing provided by generative adversarial networks (GANs) that ensure realistic counterfactuals and use latent spaces to optimize perturbations. In an embodiment, a first computer trains a generator model in a GAN. A same or second computer hosts a classifier model that inferences an original label for original feature values respectively for many features. Runtime ML explainability (MLX) occurs on the first or second or a third computer as follows. The generator model from the GAN generates a sequence of revised feature values that are based on noise. The noise is iteratively optimized based on a distance between the original feature values and current revised feature values in the sequence of revised feature values. The classifier model inferences a current label respectively for each counterfactual in the sequence of revised feature values. Satisfactory discovered counterfactuals are promoted as explanations of behavior of the classifier model.

20 Claims, 9 Drawing Sheets

(56) References Cited

U.S. PATENT DOCUMENTS

| | | | |
|---|---|---|---|
| 2019/0385019 A1* | 12/2019 | Bazrafkan | G06N 3/088 |
| 2020/0098139 A1* | 3/2020 | Kaplanyan | G06N 3/045 |
| 2020/0110982 A1 | 4/2020 | Gou | |
| 2020/0226212 A1 | 7/2020 | Tan | |
| 2020/0302318 A1 | 9/2020 | Hetherington | |
| 2022/0129791 A1 | 4/2022 | Nia et al. | |

OTHER PUBLICATIONS

Kurakin et al., "Adversarial Examples In The Physical World", ICLR 2017, Feb. 11, 2017, 14 pages.
Goodfellow et al., "Explaining and Harnessing Adversarial Examples", ICLR 2015, Mar. 20, 2015, 11 pages.
Saito et al., Improving LIME Robustness with Smarter Locality Sampling, arXiv.org, available at https://arxiv.org/pdf/2006.12302v2.pdf (revised Jul. 24, 2020).
Molnar et al., Limitations of Interpretable Machine Learning Methods, available at https://slds-lmu.github.io/iml_methods_limitations/ (Oct. 5, 2020).
Laugel, Local post-hoc interpretability for black-box classifiers. Machine Learning [cs.LG]. Sorbonne Universite, 2020 (Year: 2020).
Laugel et al., Defining Locality for Surrogates in Post-hoc Interpretablity, arXiv.org, available at https://arxiv.org/pdf/1806.07498.pdf (Jun. 19, 2018).
Lahiri A, Edakunni NU. Accurate and Intuitive Contextual Explanations using Linear Model Trees. arXiv preprint arXiv:2009.05322. Sep. 11, 2020, originally presented at KDD Workshop on ML in Finance 2020, Aug. 24, 2020 (Year: 2020).
Guidotti R, Monreale A, Ruggieri S, Pedreschi D, Turini F, Giannotti F. Local rule-based explanations of black box decision systems. arXiv preprint arXiv:1805.10820. May 28, 2018 (Year: 2018).
Deep Hyperspherical Learning, arXiv.org, available at https://arxiv.org/pdf/1711.03189.pdf (Jan. 30, 2018).
Letham et al., "Interpretable Classifiers Using Rules and Bayesian Analysis: Building a Better Stroke Prediction Model", The Annals of Applied Statistics, dated 2015, vol. 9, No. 3, 23 pages.
Agrawal et al., "Fast Discovery of Association Rules", dated 1996, 22 pages.
Baehrens et al., "How to Explain Individual Classification Decisions", Journal of Machine Learning Research 11 dated 2010, 29 pages.
Dhurandhar et al., "Explanations based on the Missing: Towards Contrastive Explanations with Pertinent Negatives", dated 2018, 12 pages.
Dougherty et al., "Supervised and Unsupervised Discretization of Continous Features", dated 1995, 9 pages.
Egan et al., "Generalized Latent Variable Recovery for Generative Adversarial Networks", dated Oct. 19, 2018, 9 pages.
Fayyad, "Multi-Interval Discretization of Continuous-Valued Attributed for Classification Learning", dated 1993, 6 pages.
Goodfellow et al., "Explaining and Harnessing Adversarial Examples", Published as a conference paper at ICLR dated 2015, 11 pages.
Goodfellow et al., "Generative Adversarial Nets", dated 2014, 9 pages.
Holte, Robert, "Very Simple Classification Rules Perform Well on Most Commonly Used Datasets", 1993 Kluwer Academic Publishers, Boston. Manufactured in The Netherlands, 28 pages.
Jin et al., "Data discretization unification", Regular Paper, Springer-Verlag London Limited 2008, 29 pages.
Lakkaraju et al., "Interpretable & Explorable Approximations of Black Box Models", KDD, dated 2017, 5 pages.
"Decision Trees", dated Jan. 26, 2005, 10 pages.
Laugel et al., "Comparison-based Inverse Classification for Interpretability in Machine Learning"., (IPMU 2018), dated Jun. 2018, Cadix, Spain, 13 pages.
Xu et al., "Modeling Tabular Data using Conditional GAN", 33rd Conference on Neural Information Processing Systems (NeurIPS 2019), dated 2019, Vancouver, Canada, 11 pages.
Letham et al., "Interpretable classifiers using rules and Bayesian analysis: Building a better stroke prediction model", vol. 9, No. 3, dated 2015, 2 pages.
Lin et al., "Experiencing SAX: a novel symbolic representation of time series", Data Min Knowl Disc (2007), 38 pages.
Lipton et al., "Precise Recovery of Latent Vectors From Generative Adversarial Networks", Workshop track—ICLR dated Feb. 17, 2017, 4 pages.
Pedregosa et al., "Scikit-learn: Machine Learning in Python", Journal of Machine Learning Research 12, dated 2011, 6 pages.
Quinlan et al., "Induction of Decision Trees", dated 1986 Kluwer Academic Publishers, Boston—Manufactured in The Netherlands, 26 pages.
Ramírez-Gallego et al., "Data discretization: taxonomy and big data challenge", WIREs Data Mining Knowl Discov 2015, 17 pages.
Ribeiro et al., "Why Should I Trust You?" Explaining the Predictions of Any Classifier, Publication rights licensed to ACM, dated 2016, 10 pages.
Robnik-Sikonja et al., "Explaining Classifications for Individual Instances", IEEE Transactions on Knowledge and Data Engineering, 20:589-600, dated 2008, 24 pages.
Samek et al., "EXPLAINABLE ARTIFICIAL INTELLIGENCE: Understanding, VISUALIZING AND Interpreting Deep Learning Models", ITU Journal: ICT Discoveries, Special Issue No. 1, Oct. 13, 2017, 10 pages.
Utgoff, Paul, "Incremental Induction of Decision Trees", 1989 Kluwer Academic Publishers, Boston. Manufactured in The Netherlands, 26 pages.
Van Looveren et al., "Interpretable Counterfactual Explanations Guided by Prototypes", dated Feb. 18, 2020, 17 pages.
Wachter et al., "Counterfactual Explanations Without Opening the Black Box: Automated Decisions and the GDPR", dated 2017, 52 pages.
Lakkaraju et al., "Interpretable Decision Sets: A Joint Framework for Description and Prediction", KDD, PMC dated Nov. 14, 2016, 24 pages.
Zhao et al., "Data-driven risk-averse stochastic optimization with Wasserstein metric", Operations Research Letters, dated 2018, 6 pages.
Vanschoren et al., "OpenML: Networked Science in Machine Learning", dated Aug. 1, 2014, 12 pages.
Sweke et al., "On the Quantum versus Classical Learnability of Discrete Distributions", dated Jul. 28, 2020, 27 pages.
Strumbelj et al., "Explaining Predictions Models and Individual Predictions with Contributions", Knowledge and Information Systems 41.3, dated Dec. 2014, pp. 647-665.
Strumbelj et al., "An Efficient Explanation of Individual Classifications Using Game Theory", Journal of Machine Learning Research 11, dated 2010, 18 pages.
Shapley, Lloyd S. "A Value for N-person Games", Contributions to the Theory of Games 2.28, dated Aug. 21, 1951, 19 pages.
Roth, Alvin, "The Shapley Value", Essays in honor of Lloyd S. Shapley, Cambridge University Press, dated 1988, 338 pages.
Ribeiro et al., "Why Should I Trust You?" Explaining the Predictions of Any Classifier, KDD dated 2016 San Francisco, CA, USA, 10 pages.
Plumb et al., "Model Agnostic Supervised Local Explanations", 32nd Conference on Neural Information Processing Systems (NeurIPS 2018), dated 2018, Montréal, Canada, 10 pages.
Lundberg et al., "A Unified Approach to Interpreting Model Predictions", 31st Conference on Neural Information Processing Systems (NIPS 2017), dated 2017, Long Beach, CA, USA, 10 pages.
Laugel et al., "Defining Locality for Surrogates in Post-hoc Interpretablity", dated Jun. 19, 2018 ICML Workshop on Human Interpretability in Machine Learning (WHI 2018), 7 pages.
Heusel et al., "GANs Trained by a Two Time-Scale Update Rule Converge to a Local Nash Equilibrium", 31st Conference on Neural Information Processing Systems (NIPS 2017), Long Beach, CA, USA, 12 pages.
Github.com, "slundberg/shap", https://github.com/slundberg/shap/blob/master/shap/explainers/_permutation.py, updated on Nov. 17, 2020, 5 pages.

(56) References Cited

OTHER PUBLICATIONS

Dua, D. and Graff, C., "UCI Machine Learning Repository" [http://archive.ics.uci.edu/ml]. Irvine, CA: University of California, School of Information and Computer Science, dated 2019, 2 pages.

Bloniarz et al., "Supervised Neighborhoods for Distributed Nonparametric Regression", Proceedings of the 19th International Conference on Artificial Intelligence and Statistics dated 2016, 10 pages.

Yeh RA et al., "Semantic image inpainting with deep generative models", In Proceedings of the IEEE Conference on Computer Vision and Pattern Recognition (pp. 5485-5493). (Year: 2017).

Srivastava A. et al., "VEEGAN—Reducing Mode Collapse in GANs using Implicit Variational Learning", Advances in Neural Information Processing Systems (Year: 2017).

Liu Y. et al., "Collaborative sampling in generative adversarial networks", In Proceedings of the AAAI Conference on Artificial Intelligence 2020 (vol. 34, No. 04, pp. 4948-4956) (Apr. 3, 2020).

Jung AB, "Learning to avoid errors in gans by manipulating input spaces", ARXIV Preprint ARXIV:1707.00768 (Jul. 3, 2017).

Hoshen Y. et al., "Non-adversarial image synthesis with generative latent nearest neighbors", Inproceedings of the IEEE/Cvf Conference on Computer Vision and Pattern Recognition (pp. 5811-5819) (Year: 2019).

Che T. et al., "Your gan is secretly an energy-based model and you should use discriminator driven latent sampling. Advances in Neural Information Processing Systems" 12275-87 (Year: 2020).

Bhattarai B. et al., "Sampling strategies for gan synthetic data", INICASSP 2020-2020 IEEE International Conference on Acoustics, Speech and Signal Processing (ICASSP) (pp. 2303-2307) (May 4, 2020).

Arvanitidis G. et al., "Latent space oddity: on the curvature of deep generative models", ARXIV Preprint ARXIV:1710.11379 (Oct. 31, 2017).

Vlassopoulos G. et al., "Explaining predictions by approximating the local decision boundary", arXiv preprint arXiv:2006.07985. (Jun. 14, 2020).

Ren, S. et al., "Generating natural language adversarial examples through probability weighted word saliency", In Proceedings of the 57th Annual Meeting of the Association for Computational Linguistics (pp. 1085-1097) (Jul. 2019).

Greco, S. "Explaining black-box models in the context of Natural Language Processing" (Doctoral dissertation, Politecnico diTorino). (Year: 2019).

Alvarez-Melis, D. et al., "A causal framework for explaining the predictions of black-box sequence-to-sequence models", ARXIV Preprint ARXIV:1707.01943 (Nov. 14, 2017).

\* cited by examiner

USING GENERATIVE ADVERSARIAL NETWORKS TO CONSTRUCT REALISTIC COUNTERFACTUAL EXPLANATIONS FOR MACHINE LEARNING MODELS

FIELD OF THE INVENTION

The present invention relates to counterfactual explanations of machine learning (ML) inferencing. Herein are generative adversarial networks (GANs) to ensure realistic counterfactuals and latent spaces to optimize perturbations.

BACKGROUND

Machine learning and deep learning are becoming ubiquitous for two main reasons: their ability to solve complex problems in a variety of different domains and the growth in the performance and efficiency of modern computing resources to support these kinds of algorithms. However, as the complexity of problems continues to increase, so too does the complexity of the machine learning models applied to those problems.

Deep learning is a prime example of this complexity trend. Some machine learning algorithms, such as neural networks, may only contain a few layers of densely connected neurons, whereas deep learning algorithms, such as convolutional neural networks, may contain tens to hundreds of layers of neurons performing vastly different operations. Increasing the depth of the model and heterogeneity of layers provides many benefits. For example, going deeper can increase the capacity of the model, improve the generalization of the model, and provide opportunities for the model to filter out unimportant features. Likewise, including layers that perform different operations can greatly improve the performance of the model. However, these optimizations come at the cost of increased complexity and reduced interpretability such as according to human understanding. Explaining and interpreting the results from complex deep learning models is a challenging task compared to many other machine learning models.

Counterfactual explanations can be used to explain individual predictions of machine learning models. These explanations describe the causal relationship between input features and the prediction of the model, which may answer questions such as, "What are the minimal changes to X to cause Y not to occur?" It is natural for humans to think in counterfactual terms to better understand outcomes of an event, such as asking what could be done differently to achieve a different outcome. For example, a customer might ask what changes should the customer make to cause a bank to approve a loan.

Counterfactual explanations explain the prediction of the model on individual instances by analyzing the causal relationship between the feature values and the model prediction. The goal of counterfactual explanation techniques is to generate new samples that are similar to an interesting original sample, but that cause different predictions from the machine learning model than the prediction on the original sample. Some counterfactual approaches slightly perturb the original sample until generated samples lead to a different prediction. Providing counterfactual explanations gives insights into how the underlying process works and what is important to the decision-making process, and therefore increases the trust in the machine learning model.

Understanding the importance of features and how they contribute to a model's prediction may be straightforward for a limited few model architectures that naturally provide at least some visibility into inferencing. For example with a linear model, the larger a feature's learned weight, the larger the impact that feature has on the output of the model. As another example, consider a classification decision tree with multiple input features. During training, the features that have the largest impact on the class predictions are inserted near the root of the tree, while the features that have less impact on class predictions fall near the leaves of the tree. The feature importance can be determined by evaluating: a) the distance of a decision node (corresponding to a feature and value that maximizes the class split at this node) to the root of the tree and b) the ability for this feature to split the class space (impurity).

Such models are often referred to as being inherently interpretable. However, as the complexity of the model increases (e.g., the number of features or depth of the decision tree increases), it becomes increasingly challenging to interpret the explanation. Similarly, even relatively simple neural networks with a few layers can be challenging to interpret, as multiple layers combine the effects of features and increase the number of operations between the model inputs and outputs. Consequently, there is a requirement for alternative techniques to aid with the interpretation of complex machine learning and deep learning models.

DETAILED DESCRIPTION

Figure 1:
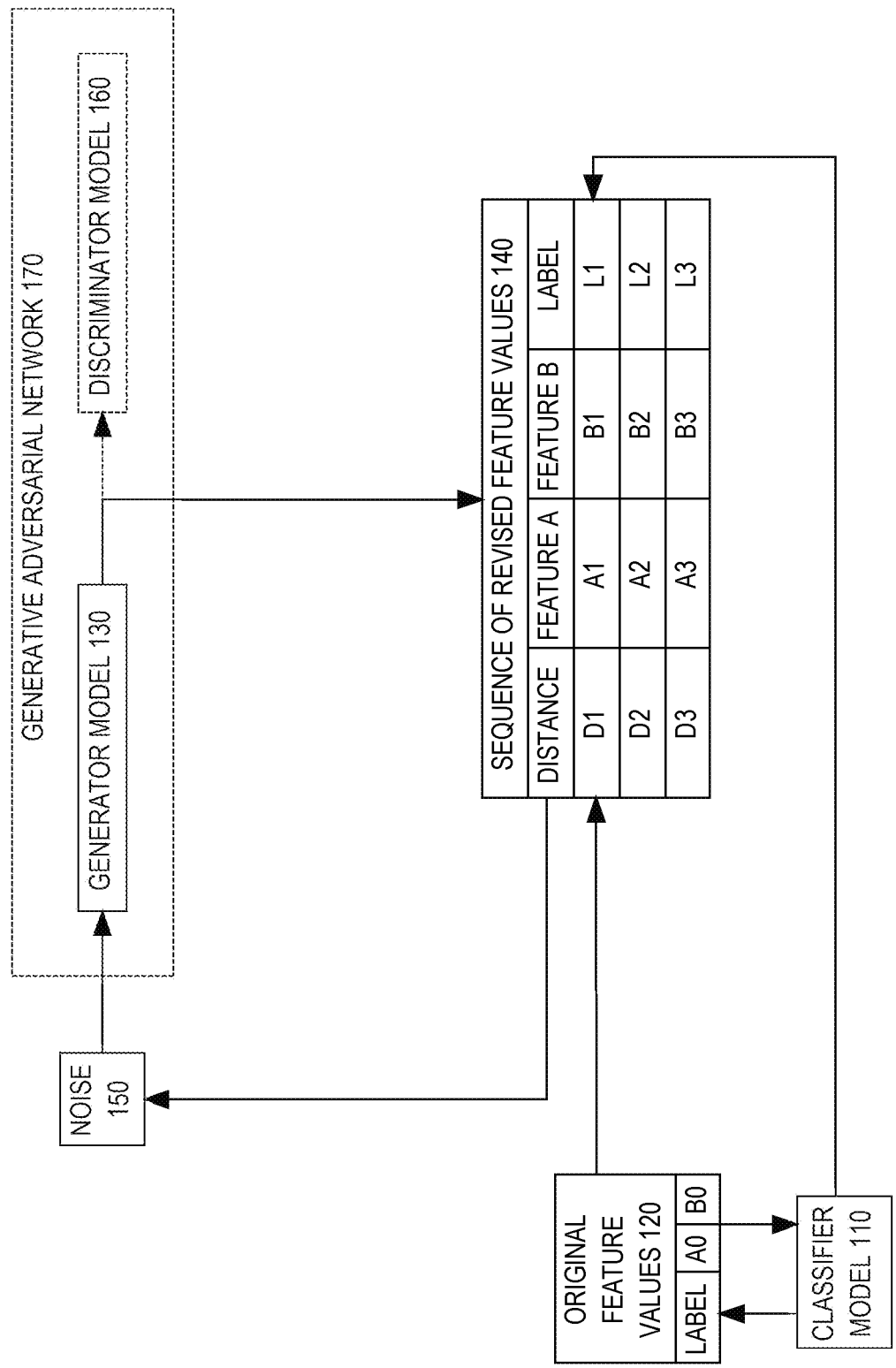
FIG. 1 is a block diagram that depicts an example computer that provides counterfactual explanations of an inference such as a label of original feature values by a machine learning (ML) model such as a classifier model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are novel counterfactual explanation techniques to locally explain any machine learning (ML) classifier or regressor on tabular datasets. These techniques make use of Generative Adversarial Networks (GANs) to generate counterfactual samples according to characteristics of a dataset that the ML model was trained on. These techniques are model-agnostic to explain any ML classifier or regressor of any architecture, whether transparent or opaque. GAN-based training minimizes the generation of out-of-distribution samples by implicitly learning the distribution of naturally occurring data. The GAN provides a generator model that generates realistic counterfactual explanations.

It is natural for humans to think in counterfactual terms in order to understand the outcome of events. Generating realistic counterfactual samples plays a significant role in increasing the trust in the machine learning models and is necessary to correctly evaluate the behavior of ML models. Herein is an efficient approach to operate a trained generator model to generate synthetic samples that are local (i.e. similar in feature values to the instance of interest) while having different predictions.

In an intuitive approach, counterfactual samples might be synthesized by randomly generating samples within growing concentric spheres around the instance-to-explain (i.e. an interesting original sample) and selecting the closest sample that changes the black-box ML model's prediction. While not optimal and potentially time consuming, such an approach can identify a set of changes to the feature values that cause the black-box ML model's prediction to change. However, there are various constraints and concerns for a feasible counterfactual explanation that may be difficult for other techniques to satisfy.

The prediction of the counterfactual examples has to be different than the instance to-explain. For example, a change in the classification output, or a change in the classification probability or regression output beyond a threshold should occur. The counterfactual examples should be as close as possible to the instance-to-explain with a minimal number of perturbed features. In other words, the goal is to find the smallest changes to the fewest number of features that cause the black-box ML model to change its prediction from the original sample beyond a specified threshold.

Tabular datasets present additional challenges. For local counterfactual explanation techniques on tabular data, there are various limitations in the ability of other techniques to handle categorical features and generate samples following the training data distribution. Moreover, the nature of the optimization required to generate the samples increases the computational complexity of generating the explanations. These limitations are technically challenging as follows.

Data distribution is crucial for realism. Counterfactual examples need to be generated according to the training data distribution. That is, the counterfactual samples should be realistic samples. Perturbing the instance-to-explain to generate the counterfactual instances may lead to out-of-distribution samples. For example, when modifying the feature values, a 600 square-foot house may have the value for its number of rooms perturbed to ten, which is unrealistic. Unrealistic data is problematic because it may confuse the black-box ML model, which decreases accuracy of inferencing such as classification. In other words, unrealistic counterfactuals occur in regions of a multidimensional problem space where the black-box ML model is unreliable or even unstable such as prone to unpredictable discontinuities in the prediction solution space that prevent a counterfactual from being modified or used as-is in the real world as predicted. Thus, unrealistic counterfactuals have little explanatory value and may undermine confidence in machine learning explainability (MLX).

Stability is not the only challenge for MLX. Categorical features defy quantitative analysis. Real world tabular datasets contain both numerical and categorical features. Counterfactual explanation techniques need to handle both datatypes in order to synthesize feasible instances. Other counterfactual explainers generate counterfactual instances by perturbing the original instance-to-explain based on mathematics. Such an approach cannot be applied to categorical features due to their discrete nature. Thus, generating realistic examples with categorical features is challenging.

Important MLX use cases are interactive and do not tolerate latency well. Customer experience (CX) may be at stake. For example, MLX may be used during a phone conversation such as with a support or sales agent. Counterfactual samples should be generated in a reasonable time. Optimizing the above concerns and criteria is expensive with high dimensional datasets having many constituent datatypes.

GAN-based approaches herein are well suited for these technical challenges as follows. GANs herein excel at generating realistic synthetic data. Unlike other counterfactual methods, which may result in data samples that are highly unlikely to occur in real data, correct behavior of the black-box ML model can be studied on realistic samples where the black-box ML model's output is presumed valid.

Herein are ways to optimize a generator model to generate samples which are strictly local to the instance-to-explain and belong to a desired target class. Other GAN approaches generate data samples that cover the whole data space (global) and belong to different classes of the dataset. However, counterfactual explanation models need to synthesize data in the local neighborhood of the instance-to-explain while having different predictions (i.e., to evaluate the minimum required change in the feature values for a significant change in the black-box model's prediction). Herein are ways to constrain a generator model to generate samples of a desired class that are also local to the instance-to-explain by optimizing a latent random variable.

The generator model takes as input random noise and transforms it into realistic synthetic samples which may contain any combination of numerical and categorical features. Approaches herein guide the random input noise toward generating samples that are close in proximity/similarity to the instance-to-explain, while having different predictions, by optimizing a custom loss function and backpropagating gradients with respect to the input noise. The changes to the feature values are caused by changes in the random input noise that is driven by the gradients' magnitude and direction. Thus, this approach can handle both numerical and categorical features seamlessly while synthesizing samples following the true data distribution.

Techniques herein provides several advantages over other solutions as follows. Feature distributions and correlations are well approximated. To study the black-box model's behavior around the instance of interest, counterfactual samples need to be generated within the local region around the instance by assigning values to each feature. If the generated samples differ significantly from those used to train the black-box model, the explanation may not be representative of the local behavior of the black-box model as observed in practice. For example, the black-box ML model output may not be valid for unexpected, improbable, or impossible combinations of input feature values. Consequently, the explanation may be misleading and/or focus on parts of the black-box ML model's behavior that will likely never occur under normal operation. Techniques herein ensure that the generated counterfactual instances follow similar feature distributions and correlations from the training data used to train the black-box model.

It is important to handle any datatype. These techniques are able to generate counterfactual examples for ML models trained on datasets with a wide variety of discrepant datatypes such as continuous or categorical. Input to the counterfactual generator is continuous random vectors which can directly be guided to generate samples of desired attributes by optimizing a custom loss function. Optimizing the proposed loss function leads the latent random vector towards generating highly local samples around the instance-to-explain while being of a desired target class.

Selecting from multiple satisfactory counterfactual instances has more explanatory power. Techniques herein efficiently and quickly generate a set of counterfactual instances, compared to the existing techniques that only provide one counterfactual instance per instance-to-explain. The benefit of having a set of counterfactual samples is that the samples can be filtered out using different constraints, such as the distance to the instance-to-explain, the confidence of the black-box model on the prediction, or the feature values to find the counterfactual examples that suit the problem.

Interactivity demands online runtime performance. Liveliness of generating counterfactual examples for a certain instance is significantly improved compared to other solutions. Once the generator model has been trained, it can be optimized to generate counterfactual instances for different samples with low latency. Offline GAN training on a given dataset may be slower than other techniques depending on the complexity of the black-box ML model and size of the dataset. However, training only needs to be done once per dataset, and the cost of training is subsequently amortized over many MLX invocations at runtime. That is, the trained generator model is reusable and fast.

In an embodiment, a first computer trains a generator model in a generative adversarial network (GAN). A same or second computer hosts a classifier model that inferences an original label for original feature values respectively for many features. Runtime machine learning explainability (MLX) occurs on the first or second or a third computer as follows. The generator model from the GAN generates a sequence of revised feature values that are based on noise. The noise is iteratively optimized based on a distance between the original feature values and current revised feature values in the sequence of revised feature values. The classifier model inferences a current label respectively for each counterfactual in the sequence of revised feature values. Satisfactory discovered counterfactuals are promoted as explanations of behavior of the classifier model.

1.0 Example Computer

FIG. 1 is a block diagram that depicts an example computer 100, in an embodiment. Computer 100 provides counterfactual explanations of an inference such as the label of original feature values 120 by a machine learning (ML) model such as classifier model 110. Computer 100 uses: a) generator model 130 to generate realistic counterfactuals such as rows 1-3 in sequence of revised feature values 140 and b) a latent space such as noise 150 to optimize perturbations of features A-B. Computer 100 may be one or more of a rack server such as a blade, a personal computer, a mainframe, a virtual computer, a smartphone, or other computing device.

Computer 100 or another computer presently or historically hosts and operates already-trained classifier model 110 to generate an inference from original feature values 120. In an embodiment, original feature values 120 is a feature vector that contains values A0-B0 for respective features A-B of a complex data item (not shown). In an embodiment, the data item is a table row in a database, and values A0-B0 are copies, derivations, or encodings of values of respective fields of the table row. In an embodiment, features A-B correspond to respective columns of the table in the database.

In an embodiment, the inference generated by classifier model 110 is the label of original feature values 120. In an embodiment, the inference generated by classifier model 110 is instead a score such as a probability and/or an anomaly score such as for anomaly detection. In an embodiment, the inference generated by classifier model 110 is instead a set of probabilities for each of many mutually exclusive possible labels. In an embodiment, classifier model 110 is not a classifier but instead has another inferential role such as regression, anomaly detection, or prediction.

Original feature values 120 and the inference generated by classifier model 110 from original feature values 120 are stored for review. In various scenarios, original feature values 120 and its inferred label are reviewed for various reasons. In one scenario, computer 100 generates an explanation of why classifier model 110 inferred that label for original feature values 120 such as for machine learning explainability (MLX).

MLX herein can provide combinations of any of the following functionalities:
  Explainability: The ability to explain the reasons behind classifier model 110's inference
  Interpretability: The level at which a human can understand the explanation
  Local Explanations: Understand why classifier model 110 made a specific inference
  What-If Explanations: Understand how changes in the values of features A-B affects classifier model 110's inference
  Model-Agnostic Explanations: Explanations treat classifier model 110 as a black box, instead of using properties from classifier model 110 to guide the explanation For example, the explanation may be needed for regulatory compliance. Likewise, the explanation may reveal an edge case that causes classifier model 110 to malfunction for which retraining with different data is needed. In another scenario, computer 100 generates suggested other feature values that are similar to original feature values 120 but that cause classifier model 110 to make a different inference.

1.1 Counterfactual

In any case, generated explanations and suggestions are based on counterfactual data such as sequence of revised feature values 140 that may be more or less similar to original feature values 120. Here, counterfactual means that sequence of revised feature values 140 is not expected to be historical data and may contain combinations of values of features that never before occurred. Each row of sequence of revised feature values 140 is a counterfactual that may be more or less similar to original feature values 120. Ideally, sequence of revised feature values 140 should be similar to original feature values 120 but different enough to cause classifier model 110 to provide a different label or other inference than the label of original feature values 120.

Although sequence of revised feature values 140 should be more or less similar to original feature values 120, sequence of revised feature values 140 may be generated without using original feature values 120 as a starting point. For example, the top row of sequence of revised feature values 140 may be the first generated counterfactual, which may be generated without any reference to original feature values 120. Instead, that first counterfactual is generated by already-trained generator model 130 that is applied to noise 150 as sole input.

1.2 Training

Generator model 130 may be an ML model that is trained to generate realistic synthetic samples (that may or may not be counterfactuals as explained later herein) such as shown in the rows of sequence of revised feature values 140. Noise 150 may have different values, as discussed later herein, that cause generator model 130 to generate different respective synthetic samples. Computer 100 hosts and operates generator model 130, but training of generator model 130 may have previously occurred on computer 100 or a different computer such as follows.

In an embodiment, generator model 130 is trained while part of generative adversarial network (GAN) 170 that contains two competing models 130 and 160 such as ML models that cooperatively train as follows. In training, generator model 130 learns to generate realistic synthetic samples, and discriminator model 160 learns to detect whether a given combination of values for features A-B is a natural combination that generator model 130 did not generate or instead a synthetic combination that generator model 130 generated.

For example such as for backpropagation in an artificial neural network (ANN), training error of discriminator model 160 may be based on: a) accurate binary or probabilistic classification (i.e. detection) of a combination of feature values as real or synthetic, and/or b) reconstruction error such as when discriminator model 160 is configured to learn how to regenerate the combination of feature values that was input such as when discriminator model 160 is an autoencoder. Likewise, training error of generator model 130 may be based on: a) by discriminator model 160, incorrect binary or probabilistic classification of a combination of feature values as real or synthetic, and/or b) reconstruction error such as when generator model 130 is configured to learn how to regenerate noise 150 that was input such as when generator model 130 is an autoencoder.

1.3 Runtime

Although generator model 130 may train as part of GAN 170, generator model 130 may be deployed with or without GAN 170 after training. For example, GAN 170 and discriminator model 160 are shown with dashed lines to indicate that they may or may not be present in computer 100. Although generating synthetic samples is the only contribution of generator model 130 in a production environment, computer 100 may process and react in various ways to each synthetic sample in sequence of revised feature values 140. Indeed, there may be a feedback loop in which computer 100 numerically analyzes a current synthetic sample to cause a quantitative adjustment to noise 150 such that generator model 130's generated sequence of revised feature values 140 evolves as follows.

When a given row of sequence of revised feature values 140 is a current synthetic sample that was most recently generated by generator model 130, the current synthetic sample is analyzed in two ways. First, classifier model 110 is applied to the current synthetic sample to generate an inference such as label L1. Second, a difference or distance of feature values between the current synthetic sample and original feature values 120 is measured such as distance D1.

Technically, generator model 130 generates synthetic samples that may or may not be counterfactuals. A synthetic sample is a counterfactual only if it would cause classifier model 110 to generate a different inference for the synthetic sample than for original feature values 110. That is, sequence of revised feature values 140 contains synthetic samples of which none, some, or all may actually be counterfactuals. Thus, generator model 130 generates potential counterfactuals, some of which may be actual counterfactuals only if some of labels L1-L3 are not the same as the label of original feature values 110. For example as explained above, labels are not used while training GAN 170. Thus while in training, generator model 130 generates synthetic samples that are not expected to be potential counterfactuals. However for demonstration, counterfactual, potential counterfactual, and synthetic sample may be synonyms herein regardless of inferred label or even if unlabeled.

1.4 Optimization

As discussed later herein, distance D1 and label L1 may be formulaically integrated to measure the explanatory capacity of the current counterfactual. That measurement may be used to judge the fitness of noise 150 as a stimulus that causes generator model 130 to generate counterfactuals that should be convincingly realistic, somewhat similar to original feature values 120, and meaningful for explanation such that label L1 and the label of original feature values 120 differ. Thus as explained later herein, quantitative analysis of a current counterfactual may be used to optimize noise 150 to cause generator model 130 to generate increasingly interesting counterfactuals that are relevant to explaining why classifier model 110 inferred a particular label or score for original feature values 120 and what small changes to original feature values 120 would cause classifier model 110 to infer a different label or substantially different score.

Because noise 150 is incrementally improved after each current counterfactual, distances D1-D3 may be more or less monotonically decreasing as generator model 130 generates counterfactuals that are increasingly similar to original feature values 120. However, optimization of noise 150 may also be affected by labels L1-L3 that may or may not override the influence of distances D1-D3. For example, generator model 130 should be able to generate counterfactuals of increasing distance from original feature values 120 if such divergence improves labels L1-L3. Thus, optimization of noise 150 may be based on opposing forces by distances D1-D3 versus labels L1-L3 such that generation of sequence of revised feature values 140 ceases when an optimal balance of distance and label is discovered such as according to convergence criteria as discussed later herein.

2.0 Machine Learning Explainability (MLX) Lifecycle

Figure 2:
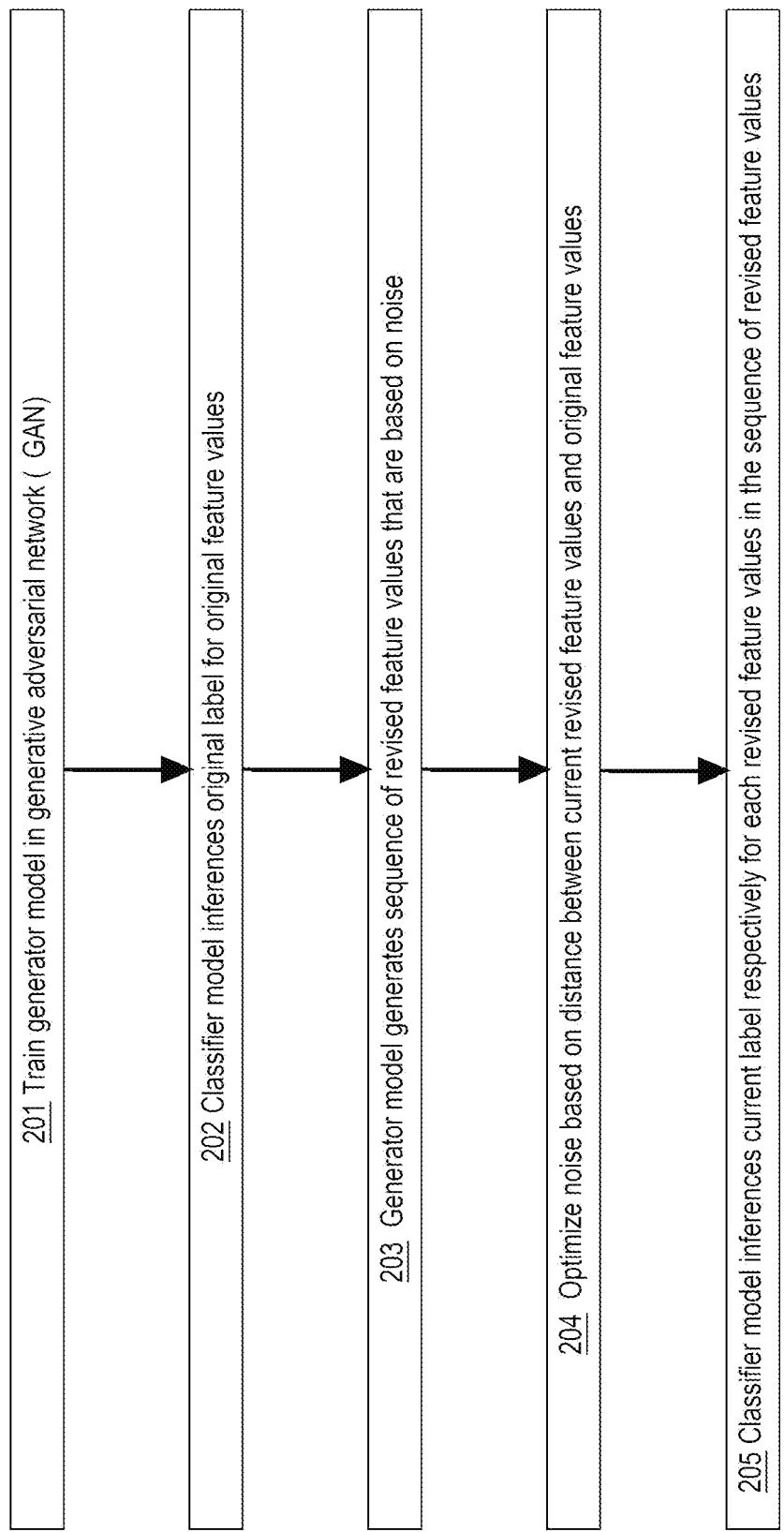
FIG. 2 is a flow diagram that depicts an example computer process that generates counterfactual explanations of an inference such as a label of original feature values by an ML model such as a classifier model.

FIG. 2 is a flow diagram that depicts an example process that an embodiment of computer 100 may perform to generate counterfactual explanations of an inference such as the label of original feature values 120 by classifier model 110. FIG. 2 is discussed with reference to FIG. 1.

Steps 201-202 are preparatory and may occur on computer 100 or a different computer such as offline. Step 201 trains generator model 130 that is embedded in generative adversarial network (GAN) 170. As explained earlier herein, models 130 and 160 within GAN 170 may cooperatively train such that generator model 130 learns to generate synthetic samples that, despite having combinations of values of features A-B that might never have occurred, are realistic. After step 201, generator model 130 is ready for production use, which may entail deploying generator model 130 on computer 100.

In an embodiment: step 201 occurs in a training laboratory; step 202 occurs in a first production environment; and steps 203-205 occur in a second production environment that includes computer 100 such as for machine learning explainability. For example, classifier model 110 and original feature values 120 may be replicated in both production environments. For example in step 202, classifier model 110 in a data processing center may reject a submission such as a loan application. In subsequent steps 203-205, computer 100 in a customer support center may suggest that paying off a credit card balance would cause classifier model 110 to accept the loan application. In any case, steps 202-205 may occur as follows.

In step 202, classifier model 110 inferences an original label for original feature values 120. For example, classifier model 110 infers a label or score for original feature values 120. Subsequent steps 203-205 are runtime activities that occur on computer 100 as follows.

In step 203, generator model 130 generates sequence of revised feature values 140 that are based on noise 150 as follows. Noise 150 may represent a latent space that is a way to constrain the learned solution space of generator model 130 after training. That is, generator model 130 learned how to generate realistic synthetic samples of more or less unlimited variety, and noise 150 effectively directs generator model 130 to generate a narrow subset of realistic synthetic samples that are somewhat similar to original feature values 120. Thus, noise 150 effectively focuses the attention of generator model 130 to a subspace of the multidimensional counterfactual solution space. Structural and statistical aspects of noise 150 are discussed later herein.

Step 204 optimize noise 150 based on feature distance of the current synthetic sample, such as distance D1 between current revised feature values A1-B1 and original feature values 120 that include A0-B0. In an embodiment, distance D1 is based on separate respective distances, such as a distance between values A0-A1 and a distance between values B0-B1. In an embodiment, separate respective distances for features A-B of a current synthetic sample are integrated according to a mathematical operation such as mean, maximum, or sum. Mathematics of noise optimization based on feature distance are discussed later herein.

In step 205, classifier model 110 inferences a current label respectively for each synthetic sample in sequence of revised feature values 140. That is, classifier model 110 respectively infers labels L1-L3 for the synthetic samples in sequence of revised feature values 140. One, some, or all synthetic samples in sequence of revised feature values 140 may be satisfactory in that they are similar to original feature values 120 but have a different desired label. One, some, or all satisfactory counterfactuals may be promoted as explanations of behavior of classifier model 110 in various MLX use cases.

In embodiments explained later herein, noise optimization by step 204 may depend on labels inferred by step 205. Thus, the ordering of steps 204-205 may depend on the embodiment. In a preferred embodiment not shown, step 205 precedes step 204.

3.0 Generator Model Operation

Figure 3:
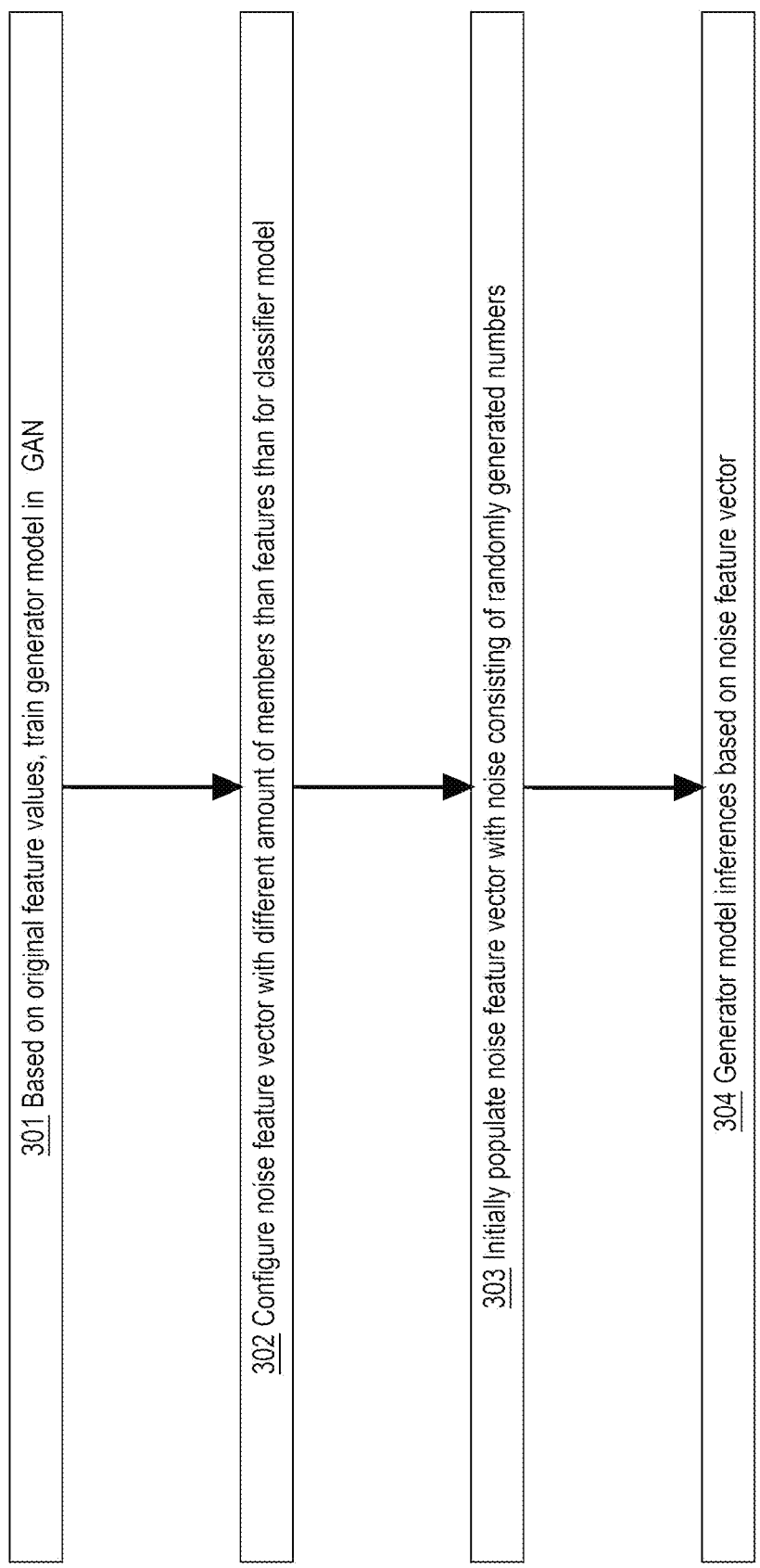
FIG. 3 is a flow diagram that depicts an example computer process to configure and operate a generator model with noise.

FIG. 3 is a flow diagram that depicts an example process that an embodiment of computer 100 may perform to configure and operate generator model 130 with noise 150. FIG. 3 is discussed with reference to FIG. 1.

Step 301 is preparatory. Training GAN models 130 and 160 may entail a potentially large training corpus of real historical data including many value combinations for features A-B and labels that were or were not inferred by classifier model 110.

For example, the following sequence may occur: a) original feature values 120 are originally labeled with or without classifier model 110, b) the same original feature values 120 and the original label are reused for GAN training, and c) the original label and original feature values 120 are later called into question under some machine learning explainability (MLX) scenario.

Discriminator model 160 may be trained with a mix of synthetic and real data that includes labeled original feature values 120. Generator model 130 may receive training feedback from discriminator model 160, which is weak (i.e. imperfect) supervision. Even though original feature values 120 is never directly applied to generator model 130 as input, weak supervision of generator model 130 by discriminator model 160 may be based on training discriminator model 160 with original feature values 120. Thus based on original feature values 120, step 301 trains generator model 130.

Steps 302-304 occur at runtime after training generator model 130 and may also occur during training. Both models 110 and 130 accept respective feature vectors of respective widths as input. For example, noise 150 may be encoded as a separate noise feature vector. Step 302 configures the noise feature vector with a different amount of members than features for classifier model 110. In an embodiment, the noise feature vector has an amount of members that is the same or proportional to an experimentally established estimated amount of counterfactuals or synthetic samples that will occur in sequence of revised feature values 140. For example, the noise feature vector may be narrower or wider than original feature values 120. That means the noise feature vector may contain fewer or more values than there are features A-B for classifier model 110. For example, the latent space of noise 150 may have reduced dimensionality compared to the original feature values 120 or vice versa. In a preferred embodiment, the noise feature vector is a two-dimensional matrix having a width equal or proportional the amount of features A-B and having a height equal or proportional to a desired or expected amount of synthetic samples.

Step 303 initially populates the noise feature vector with noise 150 consisting of randomly generated numbers. Randomness is ideal noise.

In step 304, generator model 130 inferences based on the noise feature vector. For example from the noise feature vector, generator model 130 inferences feature values A1-B1. In other words, inferencing is how generator model 130 generates a synthetic sample.

4.0 Optimization Process

Figure 4:
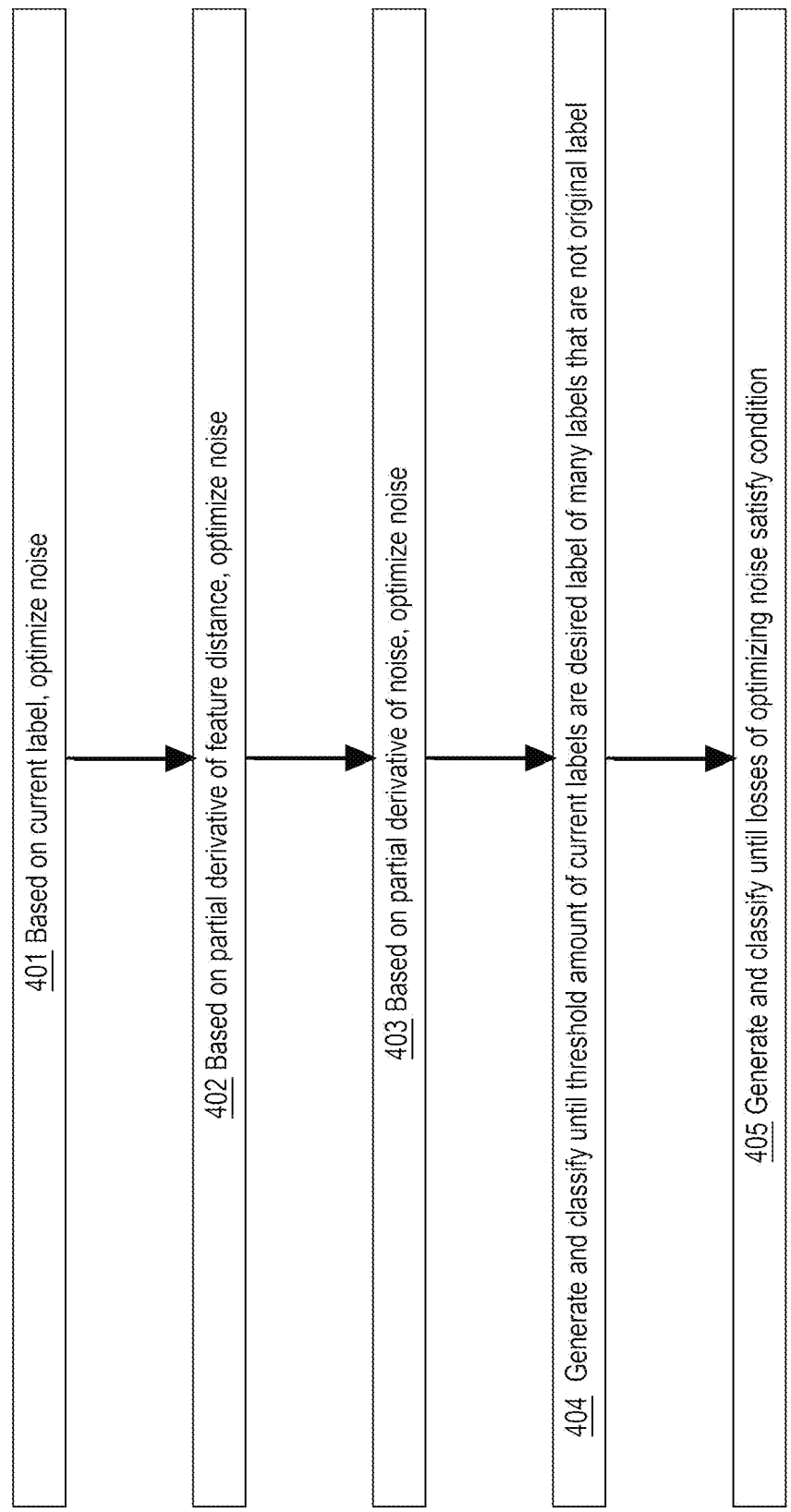
FIG. 4 is a flow diagram that depicts an example computer process to optimize noise until convergence is detected.

FIG. 4 is a flow diagram that depicts an example process that an embodiment of computer 100 may perform to optimize noise 150 until convergence is detected. FIG. 4 is discussed with reference to FIG. 1.

Steps 401-403 perform intermediate calculations that various embodiments may or may not use to quantitatively optimize noise 150. For example, steps 401-403 may influence which noise members are adjusted and the sign and magnitude of respective adjustments, which causes exploration and tuning within the latent space for generator model 130. Steps 401-403 may calculate various metrics that indicate the suitability of the current synthetic sample such as follows.

Based on the current label such as L1, step 401 optimizes noise 150. If classifier model 110 infers a same label for a synthetic sample as was inferred for original feature values 120, then the synthetic sample is not explanatory and may be too similar to original feature values 120. In that case, step 401 provides negative feedback for noise optimization, in which case future synthetic samples are more likely to be different from original feature values 120. Conversely if the label inferred for the current synthetic sample does not match the label of original feature values 120, then the current counterfactual may be explanatory and step 401 may provide positive feedback. Mathematics of label feedback are discussed later herein.

Based on the partial derivative of feature distance, step 402 optimizes noise 150. As explained earlier herein, distance between a synthetic sample and original feature values 120 is a measurement of dissimilarity that may be an aggregate of individual differences of values for respective features A-B. Step 402 penalizes distance because a goal is to discover a classification boundary around original feature values 120.

In the multidimensional problem space of features A-B, a classification boundary separates combinations of feature values based on their respective labels such that the boundary is crossed by slightly modifying values of feature(s) in a way that changes the inferred label. Although a counterfactual that is distant from original feature values 120 would likely have a different label, the distant counterfactual does not reveal how close is the classification boundary to original feature values 120. Thus, a counterfactual that is closer/similar to original feature values 120 would likely be more explanatory, which is why step 402 penalizes distance. Mathematics of distance penalization are discussed later herein.

Based on the partial derivative of noise 150, step 403 optimizes noise 150. Because noise 150 has many numeric members, noise 150 has many respective partial derivatives. In other words, each numeric member of noise 150 may be individually optimized. For example, one noise number may be increased and another noise number may simultaneously be decreased. Thus, the latent space of noise 150 is tunable in multiple dimensions, which facilitates exploration and discovery of classification boundaries around original feature values 120.

4.1 Quantitative Analytics

As explained above, numerically optimizing noise 150 may entail various terms, factors, and calculations. Mathematically, optimizing noise 150 may entail minimizing loss from noise 150 such as according to the following loss formula.

$$L = L_{target} + \lambda L_{distance}$$

The following are terms in the above loss formula:

$L_{target}$ is a penalty when the current synthetic sample does not have a desired label. In various embodiments, there is only a penalty for the original label, or there is a big penalty for the original label and a small penalty for any label that is neither the original label nor the desired label, or various labels have various penalties.

$L_{distance}$ is difference/dissimilarity of the synthetic sample from original feature values 120 such as an aggregation of individual distances for respective features A-B.

$\lambda$ is a positive weight that is a scalar for aggregate distance or a vector to be applied to the separate feature distances before aggregation.

From the above loss formula may be derived the following optimization formula that entails above steps 401-403 such as for backpropagation of numeric feedback into noise 150.

$$\nabla Loss = \frac{\partial loss}{\partial Z} = \frac{\partial L_{target}}{\partial Z} + \lambda \frac{\partial L_{distance}}{\partial Z} = \frac{\partial L_{target}}{\partial f} \frac{\partial f}{\partial X'} \frac{\partial X'}{\partial Z} + \lambda \frac{\partial L_{distance}}{\partial X'} \frac{\partial X'}{\partial Z}$$

The following are additional terms in the above optimization formula that were not discussed with the above loss formula:

$\nabla$ Loss is a vector of changes (partial derivatives) to respectively apply to the member numbers of noise 150.

$\partial loss$ is the partial derivative of loss L in the above loss formula.

$\partial Z$ is the partial derivative of noise 150 per step 403 above.

$\partial f$ is the partial derivative for labels inferred by classifier model 110 for sequence of revised feature values 140 such as the current synthetic sample.

$\partial X'$ is the partial derivative for values of features A-B for sequence of revised feature values 140 such as the current synthetic sample.

4.2 Convergence

Steps 401-403 repeat for each synthetic sample in sequence of revised feature values 140 until some stopping criterion occurs. Steps 404-405 are complementary stopping criteria such that various embodiments may require only step 404, only step 405, either step 404 or 405, or both steps 404-405 to detect that iteration should cease as follows.

In an embodiment, there are many possible labels of which only one is the label of original feature values 120 and only another one is the desired label for counterfactuals. Step 404 generates sequence of revised feature values 140 and inferences labels for synthetic samples until a threshold amount of counterfactual labels are the desired label of many labels that are not the original label. For example, high, medium, and low may be labels. The original label may be high and the desired label may be low. Iteration should not cease merely because a sequence of counterfactual labels switched from high to medium. The threshold may determine whether iteration ceases upon first inferring low as a current label, or whether some minimum amount of additional counterfactuals having the same desired low label need generating.

Step 405 generates sequence of revised feature values 140 and inferences labels for synthetic samples until losses from optimizing noise 150 satisfy a condition. For example, there may be an absolute threshold on how small loss L in the above loss formula is sufficient for stopping. Likewise, there may be a relative threshold on how small a magnitude of ∇Loss in the above optimization formula is sufficient for stopping. An embodiment may also impose a minimum or maximum on how many iterations occur instead of, or in addition to, steps 404-405.

5.0 Architectural Operation

Figure 5:
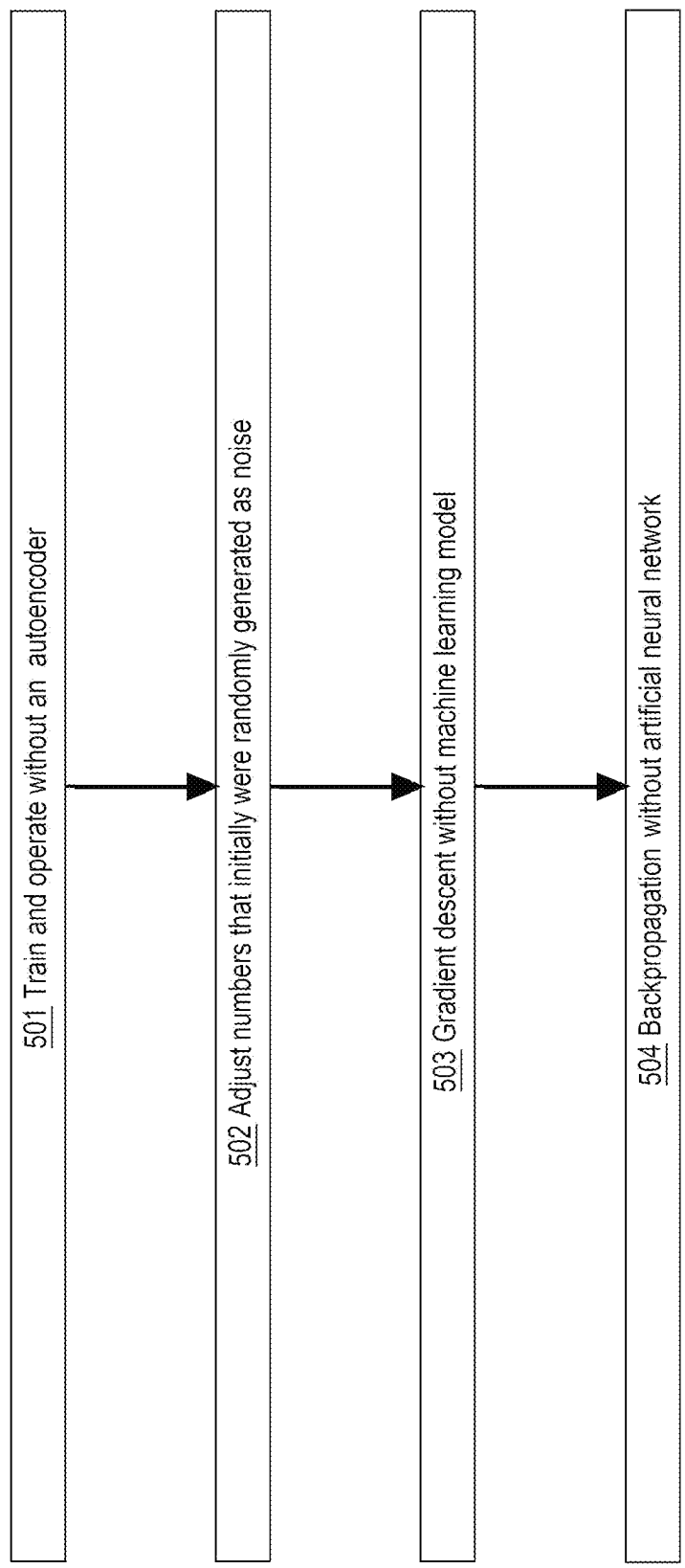
FIG. 5 is a flow diagram that depicts an example computer process during training or operation, including optimizing noise.

FIG. 5 is a flow diagram that depicts an example process that an embodiment of computer 100 may perform during training or operation, including optimizing noise 150. FIG. 5 is discussed with reference to FIG. 1.

Step 501 trains and explains without an autoencoder. That is unlike other techniques, none of models 110, 130, and 160 need be autoencoders.

Steps 502-504 optimize noise 150. Various embodiments may entail one, some, or all of steps 502-504 that may be combined into a single noise optimization step as follows.

Step 502 adjusts numbers that initially were randomly generated as noise 150. That is, noise 150 is initially random but, due to iterative optimization that does not entail randomness, gradually becomes tuned to cause generator model 130 to generate counterfactuals that are similar to original feature values 120 but without causing the original label. Convincing realism of counterfactuals is not a purpose of noise optimization, because generator model 130 was already trained to consistently generate realistic counterfactuals.

Step 503 performs gradient descent without adjusting an ML model. Gradient descent optimizes noise 150 that is not an ML model. The learned internal configuration of generator model 130 is not adjusted by noise optimization because generator model 130 was already fully trained.

Step 504 performs backpropagation without adjusting an artificial neural network (ANN). Backpropagation occurs according to the optimization formula presented earlier herein that adjusts noise 150 that is not an ANN.

6.0 Initialization and Resampling

Figure 6:
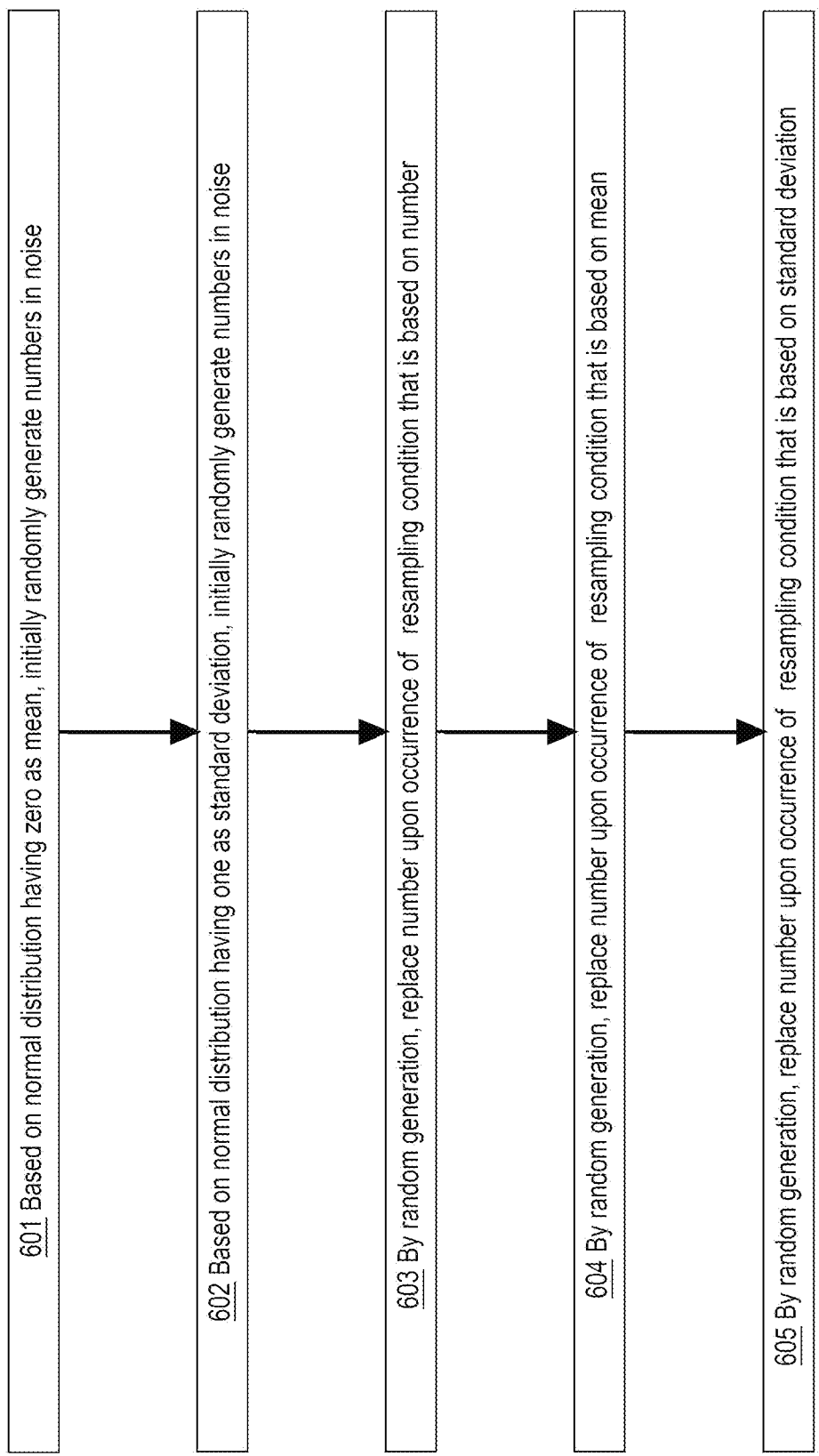
FIG. 6 is a flow diagram that depicts an example computer process to initialize and resample noise.

FIG. 6 is a flow diagram that depicts an example process that an embodiment of computer 100 may perform to initialize and resample noise 150. FIG. 6 is discussed with reference to FIG. 1.

Various embodiments may entail one or both of steps 601-602 that may be combined into a single noise initialization step as follows. Based on a normal distribution having zero as a mean, step 601 initially randomly generates numbers in noise 150. Based on a normal distribution having one as a standard deviation, step 602 initially randomly generates numbers in noise 150.

After initialization by steps 601-602, noise 150 is iteratively optimized as discussed earlier herein. Due to random initialization, noise 150 may unfortunately become more or less trapped in a local optimum that is far from a global optimum. The local optimum may somewhat frustrate noise optimization such that numeric penalties discussed earlier herein cause sequence of revised feature values 140 to evolve along a tangent that is not an improvement.

Steps 603-605 impose limits on how far can noise 150 stray before concluding that initialization of noise 150 was poor and that reinitialization of noise 150 may be an only way to approach the global optimum. Herein, reinitialization of noise 150 is known as resampling, which may affect one, some, or all member numbers in noise 150. Various embodiments may entail one, some, or all of steps 603-605 that may be combined into a single noise resampling step as follows.

By random generation, step 603 replaces member number(s) in noise 150 upon occurrence of a resampling condition that is based on current values of number(s) in noise 150. For example, numbers may be range bounded such that straying out of range causes step 603 to resample noise 150.

By random generation, step 604 replaces number(s) upon occurrence of a resampling condition that is based on a mean. For example, sequence of revised feature values 140 may have its own fluctuating mean that, if strays more than a threshold magnitude away from the initialization mean of above step 601, causes step 604 to resample noise 150.

By random generation, step 605 replaces number(s) upon occurrence of a resampling condition that is based on a standard deviation. For example, sequence of revised feature values 140 may have its own fluctuating standard deviation that, if strays more than a threshold amount away from the initialization standard deviation of above step 602, causes step 605 to resample noise 150.

7.0 Generative Adversarial Network (GAN) Deployment

Figure 7:
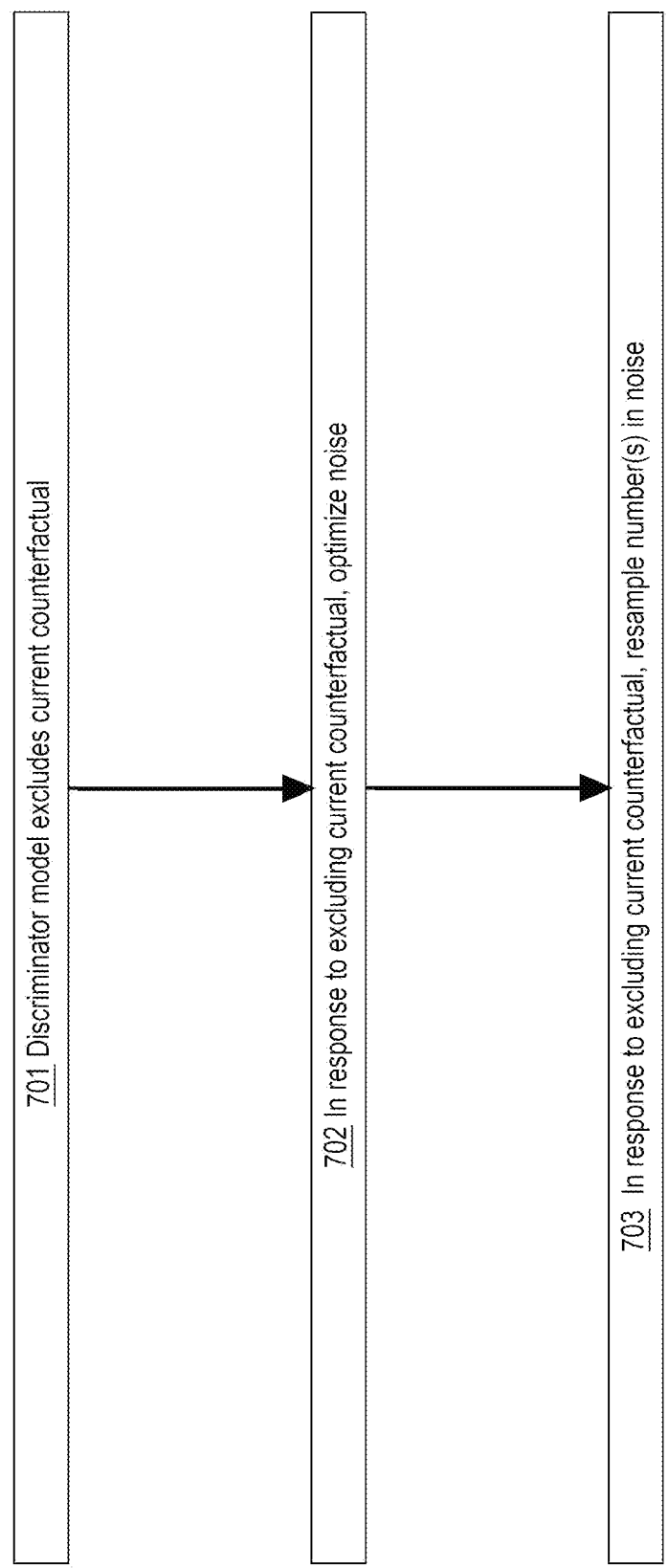
FIG. 7 is a flow diagram that depicts an example computer process for increased realism of counterfactuals.

FIG. 7 is a flow diagram that depicts an example process that an embodiment of computer 100 may perform for increased realism of counterfactuals. FIG. 7 is discussed with reference to FIG. 1.

As explained earlier herein, discriminator model 160 need not be deployed into production. However if discriminator model 160 is optionally deployed after training, one, some, or all of steps 701-703 may occur.

In step 701, discriminator model 160 excludes the current synthetic sample from sequence of revised feature values 140. For example when discriminator model 160 detects that the current synthetic sample is unrealistic, the synthetic sample may be discarded as if never generated by generator model 130.

In response to step 701 excluding the current synthetic sample, step 702 optimizes noise 150. For example, noise optimization occurs as if the synthetic sample were not excluded, including classification by classifier model 110, but the excluded synthetic sample is not retained as explanatory, even when the synthetic sample has low loss according to the loss formula presented earlier herein and/or has the desired target label. That is, unrealistic synthetic samples need not be retained as explanatory.

In response to step 701 excluding the current synthetic sample, step 703 resamples number(s) in noise 150 as discussed earlier herein. That is, generating an unrealistic synthetic sample seldom occurs and indicates that current noise 150 might be confusing generator model 130.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
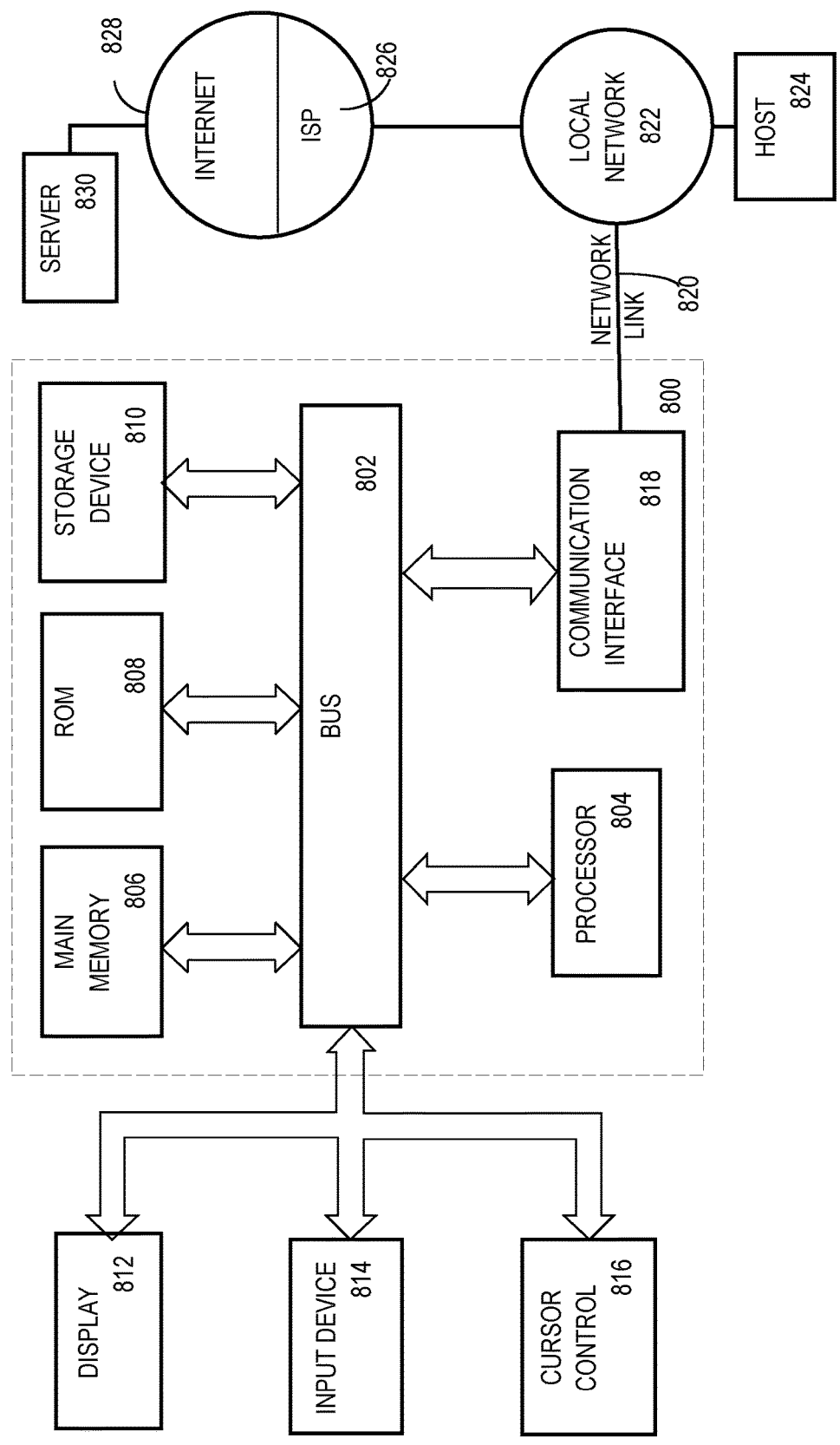
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
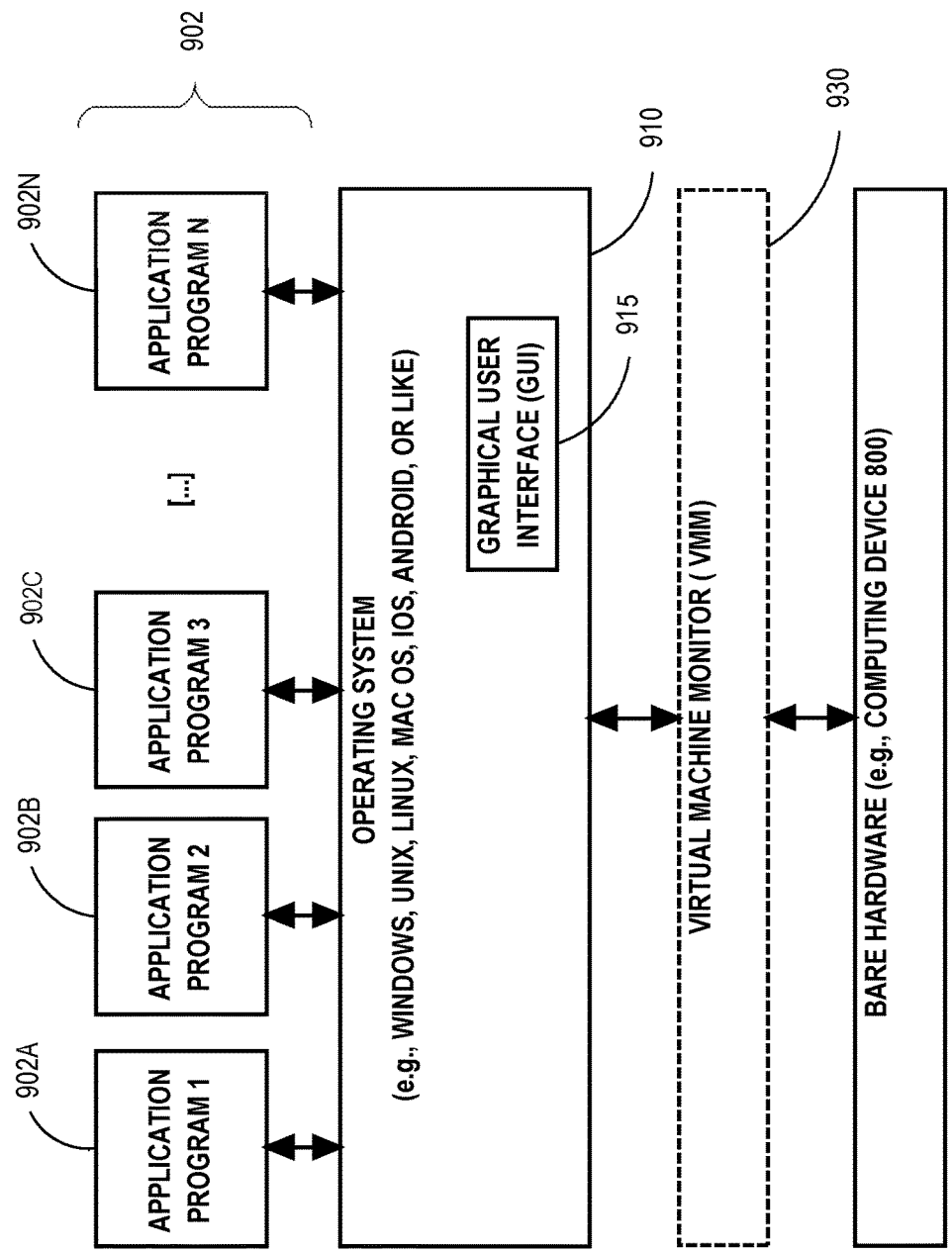
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

Generative Adversarial Network (GAN)

Generative adversarial networks (GANs) are a kind of machine learning algorithm that was originally designed to generate realistic synthetic images but has broader applicability. In an embodiment, a GAN comprises two machine learning models, such as neural networks, acting as two opposing algorithms, a generator and a discriminator. The roles of these neural networks are as follows. The generator tries to generate realistic synthetic data similar to the training data distribution. The generator's training objective is to increase the error rate of the discriminator by producing samples that the discriminator believes are coming from the actual data distribution.

The discriminator tries to distinguish the synthetic data distribution from the true data distribution. The discriminator's training objective is to learn the boundary between authentic (real) and synthetic (fake) data.

In an embodiment, the generator takes as input a random vector, also known herein as a latent random variable, and transforms the random vector into synthetic data similar to the real-world data. The discriminator takes as input the synthetic data generated by the generator and the true data from an input dataset and tries to classify them as real or fake. Although the generator and discriminator train together, the generator can be deployed with or without the discriminator after training.

GAN Training

In an embodiment, the generator, G, is a differentiable multilayer perceptron with parameters $\theta g$ that learns to map the input noise variables, z, to the required data space of synthetic samples. This mapping is represented by $G(z; \theta g)$. In an embodiment, the discriminator, D, is also another multilayer perceptron with parameters $\theta d$ that learns to output a scalar, $D(x; \theta d)$, that represents the probability that x came from the true data rather than the synthetic data. During training, D and G effectively play a two-player minimax game in which D tries to maximize the probability of assigning the correct labels to the training data and the synthetic data, and G tries to maximize the probability of the synthetic data being labeled as authentic data. Mathematically, this can be expressed as the following minimax formula.

$$\text{Min-}_G \text{max-}_D V(D,G) = \Sigma_{x \sim X} \log(D(x)) + \Sigma_{z \sim N(0,1)} \log(1 - D(G(z)))$$

With the above minimax formula, D tries to maximize the loss by correctly evaluating the probability that the input sample came from the actual data distribution. Specifically, D tries to maximize $D(x)$ (x represents samples from the true data) and minimize $D(G(z))$ ($G(z)$ represents the synthetic data). On the other hand, G attempts to minimize the loss function by minimizing the $\log(1-D(G(z)))$ or, equivalently, maximizing $D(G(z))$ (fooling the discriminator, D, to think that the synthetic data samples came from the true data). The components of a GAN are trained simultaneously. The gradient of D guides G to flow to regions of the sample space that are more likely to be classified as true data. In an ideal scenario, after several iterations of training, both D and G reach their optimal state at which they cannot improve anymore. In this case, G has successfully learned the true data distribution and D is unable to distinguish between the two distributions (i.e. outputs $D(x)=\frac{1}{2}$ for any given sample, regardless of whether the sample came from the true data distribution or the synthetic data distribution).

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    inferring, by a trained classifier, an original classification from at least three classes for an original plurality of feature values respectively for a plurality of features;
    generating, by a generator model from a generative adversarial network (GAN), a first revised plurality of feature values that are based on noise;
    detecting that the trained classifier infers the original classification from the first revised plurality of feature values;
    optimizing the noise, including minimizing a loss, including increasing the loss in response to said detecting, wherein the loss is based on a distance between: i) the first revised plurality of feature values and ii) the original plurality of feature values;
    generating, by the generator model after said optimizing, a second revised plurality of feature values that are based on the noise;
    inferring, by the trained classifier, a second classification for the second revised plurality of feature values, wherein the second classification is different from the original classification; and
    generating and displaying a counterfactual explanation, for the original classification, that comprises the second revised plurality of feature values;
    wherein the method is performed by one or more computers.

2. The method of claim 1 wherein said inferring for each revised plurality of feature values comprises repeatedly inferring until a threshold amount of a sequence of classifications have a desired class that is not a class of the original classification.

3. The method of claim 1 wherein said optimizing the noise is further based on at least one selected from a group consisting of a partial derivative of the noise and a partial derivative of said distance.

4. The method of claim 1 wherein said optimizing the noise entails none of: randomness, training the generator model, and adjusting the generator model.

5. The method of claim 1 wherein said optimizing the noise entails at least one selected from a group consisting of: gradient descent without a machine learning model, backpropagation without an artificial neural network, and adjustment of a plurality of numbers that initially were randomly generated as said noise.

6. The method of claim 5 wherein said adjustment of the plurality of numbers comprises replacement, by random generation, of a number of the plurality of numbers upon occurrence of a resampling condition that is based on at least one of: said number, a mean, and a standard deviation.

7. The method of claim 5 further comprising initially randomly generating said plurality of numbers in said noise based on a normal distribution having at least one statistic selected from a group consisting of: zero as a mean and one as a standard deviation.

8. The method of claim 1 wherein said generating said first revised plurality of feature values comprises the generator model from the GAN inferring based on a noise feature vector that consists of said noise.

9. The method of claim 8 wherein said generator model inferring comprises the generator model from the GAN inferring based on said noise feature vector that does not contain a same amount of members as the plurality of features.

10. The method of claim 1 without using an autoencoder.

11. The method of claim 1 further comprising training the generator model in the GAN based on a training corpus that does not contain said original plurality of feature values.

12. The method of claim 1 further comprising:
training the generator model in the GAN;
training a discriminator model in the GAN;
deciding, by said discriminator model, to exclude said first revised plurality of feature values.

13. The method of claim 12 further comprising in response to said deciding to exclude said first revised plurality of feature values, performing one selected from a group consisting of:
said optimizing the noise, and
replacement, by random generation, of at least one number in the noise.

14. One or more non-transitory computer-readable media storing instructions that, when executed by one or more processors, cause:

inferring, by a trained classifier, an original classification from at least three classes for an original plurality of feature values respectively for a plurality of features;
generating, by a generator model from a generative adversarial network (GAN), a first revised plurality of feature values that are based on noise;
detecting that the trained classifier infers the original classification from the first revised plurality of feature values;
optimizing the noise, including minimizing a loss, including increasing the loss in response to said detecting, wherein the loss is based on a distance between: i) the first revised plurality of feature values and ii) the original plurality of feature values;
generating, by the generator model after said optimizing, a second revised plurality of feature values that are based on the noise;
inferring, by the trained classifier, a second classification for the second revised plurality of feature values, wherein the second classification is different from the original classification; and
generating and displaying a counterfactual explanation, for the original classification, that comprises the second revised plurality of feature values.

15. The one or more non-transitory computer-readable media of claim 14 wherein said inferring for each revised plurality of feature values comprises repeatedly inferring until a threshold amount of a sequence of classifications have a desired class that is not a class of the original classification.

16. The one or more non-transitory computer-readable media of claim 14 wherein said optimizing the noise is further based on at least one selected from a group consisting of a partial derivative of the noise and a partial derivative of said distance.

17. The one or more non-transitory computer-readable media of claim 14 wherein said optimizing the noise entails none of: randomness, training the generator model, and adjusting the generator model.

18. The one or more non-transitory computer-readable media of claim 14 wherein said optimizing the noise entails at least one selected from a group consisting of: gradient descent without a machine learning model, backpropagation without an artificial neural network, and adjustment of a plurality of numbers that initially were randomly generated as said noise.

19. The one or more non-transitory computer-readable media of claim 14 wherein said generating said first revised plurality of feature values comprises the generator model from the GAN inferring based on a noise feature vector that consists of said noise.

20. The one or more non-transitory computer-readable media of claim 14 wherein when executed the instructions do not use an autoencoder.

* * * * *